(12) United States Patent
Fannasch et al.

(10) Patent No.: US 9,329,055 B2
(45) Date of Patent: May 3, 2016

(54) INDUCTIVE SENSOR DEVICE WITH AT LEAST ONE COIL

(71) Applicant: Hella KGaA Hueck & Co., Lippstadt (DE)

(72) Inventors: Lothar Fannasch, Büren (DE); Henning Irle, Lippstadt (DE)

(73) Assignee: HELLA KGAA HUECK & CO. (DE)

( * ) Notice: Subject to any disclaimer, the term of this patent is extended or adjusted under 35 U.S.C. 154(b) by 71 days.

(21) Appl. No.: 14/226,394

(22) Filed: Mar. 26, 2014

(65) Prior Publication Data

US 2014/0292310 A1    Oct. 2, 2014

(30) Foreign Application Priority Data

Mar. 26, 2013   (DE) .......................... 10 2013 103 055

(51) Int. Cl.
    *G01R 33/02*     (2006.01)
    *G01D 5/14*     (2006.01)
    *G01D 5/20*     (2006.01)

(52) U.S. Cl.
    CPC ... *G01D 5/14* (2013.01); *G01D 5/20* (2013.01)

(58) Field of Classification Search
    CPC ........ G01V 3/104; G01R 33/02; G01R 33/12; G01R 31/315; G01B 7/14; G01D 5/20; G01D 5/202; G05B 2219/37277; G06K 19/07783; G06K 7/082
See application file for complete search history.

(56) References Cited

U.S. PATENT DOCUMENTS

| | | | |
|---|---|---|---|
| 4,042,876 A * | 8/1977 | Visioli, Jr. ................ | 324/207.16 |
| 6,443,179 B1 * | 9/2002 | Benavides et al. ......... | 137/454.2 |
| 6,734,665 B2 * | 5/2004 | Jagiella et al. ........... | 324/207.16 |
| 7,071,685 B2 | 7/2006 | Saltsov et al. | |
| 2006/0290346 A1 * | 12/2006 | Habenschaden ....... | G01D 5/202 324/207.16 |
| 2009/0309578 A1 | 12/2009 | Cochran | |
| 2012/0168901 A1 | 7/2012 | Santangelo et al. | |

FOREIGN PATENT DOCUMENTS

| | | |
|---|---|---|
| EP | 1672323 A2 | 6/2006 |
| GB | 2394293 A | 4/2004 |

* cited by examiner

*Primary Examiner* — Son Le
(74) *Attorney, Agent, or Firm* — Husch Blackwell LLP

(57) ABSTRACT

An inductive sensor device for a motor vehicle includes a coil, wherein the coil is arranged on a carrier element and the coil is connected electrically to an electronics unit and wherein an induced voltage can be registered by the coil (10). The carrier element has a first side and the coil is formed by at least one planar coil on the first side of the carrier element.

7 Claims, 2 Drawing Sheets

INDUCTIVE SENSOR DEVICE WITH AT LEAST ONE COIL

CROSS REFERENCE

This application claims priority from German Patent Application No. 10 2013 103055.6, filed Mar. 26, 2013, which is incorporated by reference herein in its entirety.

TECHNICAL FIELD OF THE INVENTION

The invention relates to an inductive sensor device for a motor vehicle with at least one coil.

BACKGROUND OF THE INVENTION

It is known that winding coils are used for detecting induced voltages in sensor devices. This detection uses the physical effect of electromagnetic induction, wherein an electric field is generated in a coil by changes in a magnetic flux density. This arrangement enables the formation of a no-contact sensor, whereby a maintenance-free sensor can be produced. The winding coil is here arranged on a carrier material. It has proven disadvantageous, however, that the overall structural shape of the sensor device is significantly influenced by the winding coil.

SUMMARY OF THE INVENTION

The problem of the present invention is to disclose a sensor device, wherein the sensor device is essentially influenced only by the structural shape of the carrier element. In particular, the problem of the present invention is to disclose a sensor device with a simple and cost-effective construction.

To solve this problem, there is provided an inductive sensor device for a motor vehicle with a coil, wherein the coil is arranged on a carrier element. The coil is connected electrically to an electronics unit. An induced voltage can be registered by the coil. According to the invention it is provided that the carrier element has a first side, wherein the coil is formed by at least one planar coil on the first side of the carrier element. The use of a planar coil makes it possible for the structural shape of the carrier element to remain essentially unchanged. Considerations for the package space of the sensor device therefore can depend only on the structural shape of the carrier element and can be independent of the geometry and/or the actual dimensions of the planar coil. Accordingly, during the development of an inductive measurement system that uses the sensor device according to the invention, the package space of the measurement system is independent of the geometry of the planar coil. The planar coil can be made from thin wires that are positioned in a planar arrangement, i.e., in the plane of the carrier element. The wires can be arranged on the carrier element, e.g., by means of a bonding method. Here it is conceivable that more than one planar coil is arranged on the carrier element. Thus the electronics unit can precisely detect the induced voltage in the planar coil caused by a changing magnetic field that acts on the planar coils. Thus, e.g., three planar coils can be used that are likewise arranged on the first side of the carrier element. The more planar coils are arranged on the first side of the carrier element, the more precise the induced voltage can be detected by the electronics unit. Thus, the inductive sensor device can be used as a receiver coil in the inductive measurement system. The inductive measurement system can have, e.g., the inductive sensor device as the receiver coil, a transmitter coil, and a rotor. The transmitter coil and the receiver coil, i.e., the inductive sensor device according to the invention, can here be arranged on the carrier element together with the electronics unit. An alternating current that generates an electromagnetic field in the transmitter coil can then flow through the transmitter coil, wherein the rotor is penetrated by the changing electromagnetic field. Here the rotor has at least one rotor coil, wherein an alternating current that generates, in turn, an electromagnetic field that leads to reactions on the receiver coil is likewise generated in the rotor coil by the changing electromagnetic field. Therefore, a voltage that is dependent on the position of the rotor and can be evaluated by the electronics unit can be induced in the receiver coil. The rotor can be arranged at a certain distance so that it can rotate accordingly and without contacting the receiver coil. Here, a distance of 0.05 mm to 7 mm is advantageous to be able to reliably evaluate the induced voltages through the receiver coil by the electronics unit in the measurement process. Advantageously, through an arrangement of at least two planar coils, a more precise rotational movement of the rotor can be detected than for a use of one planar coil. A higher winding density also contributes to a more precise detection of the induced voltage. Thus, the detection of the rotor movement can be used for an angle measurement. Thus, even very small rotational movements of the rotor can be detected by the inductive sensor device. Likewise it is conceivable that a translational movement can also be detected by the inductive sensor device according to the invention. Thus, a measurement coil can be moved past the inductive sensor device with a translational movement, so that the same principle applies here as in the measurement system with the rotor and the receiver coil. When the measurement coil passes the receiver coil, an alternating current can be induced in the measurement coil that generates, in turn, an electromagnetic field that can lead, in turn, to reactions on the inductive sensor device, i.e., of the receiver coil. The translational movement of the measurement coil can then be evaluated by the electronics unit through the induced voltage in the inductive sensor device. It is also conceivable that the planar coil has a three-phase construction, wherein each coil can be arranged offset by 120° in the plane. Thus coil geometries can be created that can use the first side of the carrier element, whereby induced voltages in the coil can be measured exactly by an alternating magnetic field.

It is especially advantageous that the planar coil is formed as a conductive track, in particular, as a meander-shaped, spiral, or helical conductive, track. The formation of the planar coil as a conductive track offers the advantage that the structural height of the carrier element is essentially not influenced by the planar coil. The conductive track can have significantly smaller dimensions in its height than the height of the carrier element. Thus, an epoxy circuit board can be used as the carrier element. The epoxy circuit board can be coated with a copper film on the first side. The copper film can be placed on the epoxy circuit board by means of a bonding process. The conductive track can be produced on the epoxy circuit board by means of an etching or milling process. The advantage of the etching method lies in a quick and cost-effective creation of the conductive track as a planar coil. One advantage of the milling process lies in the chemical-free formation of the conductive track on the epoxy circuit board. It is also conceivable that the carrier element is produced from plastic. Plastic is a good insulator, whereby the first side of the carrier element can be very well insulated from the other sides of the carrier element. In addition, an elastic plastic can be used, whereby the use of the inductive sensor device can be used in houses subject to tolerances. Thus, the sensor device can be used as an angle measurement device, e.g., for a throttle blade of a combustion engine. The formation of the planar coil as a meander-shaped conductive track offers the advantage that connection elements of the meander-shaped planar coil are adjacent to each other. Therefore, a direct connection to the electronics unit can be guaranteed. The formation of the planar coil as a helical conductive track can increase the sensitivity for detecting the induced voltage.

It can be further advantageous that the carrier element has a first opening, wherein the electronics unit is arranged in the area of the first opening. Thus, the electronics unit can be advantageously arranged in the first opening. The carrier element has a certain height, wherein the height of the first opening is predetermined by the height of the carrier element. The electronics unit can be defined in its structural shape so that it can accurately fit into the first opening. The electronics unit can be a microchip, wherein the height of the chip is exactly equal to the height of the carrier element. This arrangement creates a continuous plane on the first side. Thus it is conceivable that a conductive film, in particular, a copper film, is arranged in the area of the first opening advantageously on the first side. The arrangement of the copper film defines the first opening to one side. The carrier element has a second side, wherein the first opening can be reached via the second side. The electronics unit can be placed accordingly on the reverse side of the copper film in the first opening. Here, the electronics unit can be bonded to the copper film by means of a bonding process. In the case that the electronics unit is smaller in its dimensions than the first opening, the resulting space can be filled by means of a sealing process. Here, a sealant can be used that can electrically insulate the electronics unit from the edge of the first opening. In addition, the sealant can fix the electronics unit in the area of the first opening. Furthermore it is conceivable that instead of the copper film, a gold film is used, wherein the gold film is advantageously resistant to corrosion. Likewise, aluminum films can be used, because they have good conductance for a lower mass and a better corrosion resistance like copper.

Likewise it is conceivable according to the invention that the carrier element has at least one second opening, wherein a first end of the coil is arranged in the area of the second opening. Through the second opening, the first side of the carrier element can be connected electrically with a conductive element to the second side of the carrier element. The conductive element can be formed as a wire. In the case that the planar coil is formed, e.g., as a helical conductive track, wherein the helical conductive track likewise has a second end, a second opening can be arranged at the first end of the helical conductive track and at the second end of the helical conductive track. An electrical contact to the second side of the carrier element can then be produced through each of the openings. Likewise, the electronics unit can be arranged on the second side of the carrier element. Through the arrangement of the second opening and the electronics unit on the second side of the carrier element, a crossing of conductive tracks on the first side can be effectively omitted. Accordingly, the tracks on the first side of the carrier element can be electrically contacted via the second side of the carrier element. Here, a wire can be used as the electrically conductive element, wherein the wire can be guided directly from the first side via the second opening to the connection element of the electronics unit on the second side. It is especially advantageous that the first side of the carrier element and/or the second side of the carrier element is coated with a protective layer. Because the conductive tracks can be produced from a copper-laminated circuit board by means of an etching or milling process, the conductive track can be coated with a protective layer for protection from external environmental effects. This protective layer is simultaneously used for insulating the conductive track from an outer package space. Thus, in addition to use of the inductive sensor device in an inductive measurement system, it can be guaranteed that no short circuit can be caused if there is a short-term contact, e.g., of the rotor to the carrier element. This can be the case, e.g., if the measurement system vibrates severely.

According to one advantageous refinement of the device according to the invention it is provided that the first opening and/or second opening of the carrier element are punched. The punching process of the first and/or second opening guarantees a parallel production of the first and/or second opening. Thus, punches can be used to perforate the carrier element. These punches can be simultaneously used so that the first and second openings of the carrier element can be produced in one processing step. Advantageously there is no abrasion leading to copper chips and this also does not happen during a drilling process for forming the first and/or second openings. The punched parts correspond exactly to the required openings in the carrier element, wherein it can be guaranteed that the punched parts do not have a disruptive effect in the subsequent production processes. In addition, a suction device can be used in the production of the first and/or second opening of the carrier element so that after the punching process, the punched carrier element parts can be suctioned away directly.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
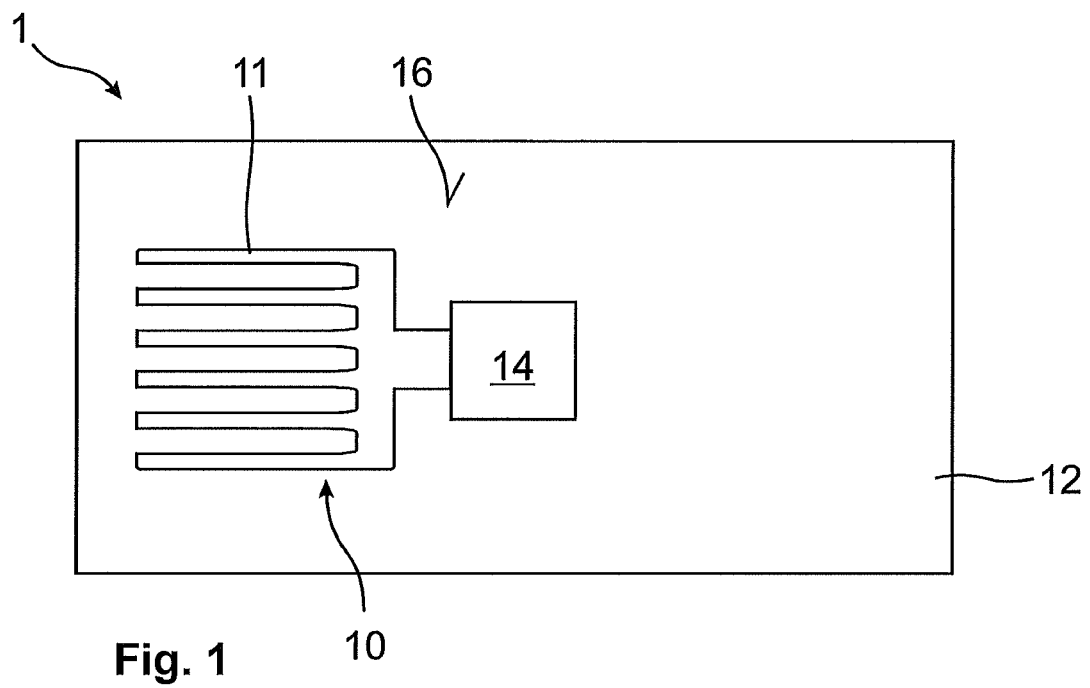
FIG. 1 is a schematic view of an inductive sensor device with a first side of a carrier element.

In FIG. 1, a view of a first side 16 of a carrier element 12 of an inductive sensor device 1 is shown schematically. The first side 16 here has a planar coil 11. The planar coil 11 is here connected electrically to an electronics unit 14. It is conceivable that, instead of a meander-shaped coil, also a helical coil could be used. Furthermore it is conceivable that several planar coils could be used. Thus mixed forms are conceivable, wherein meander-shaped, helical, circular, or zigzag-shaped planar coils could be used. All planar coils can be connected electrically to the electronics unit 14.

Figure 2:
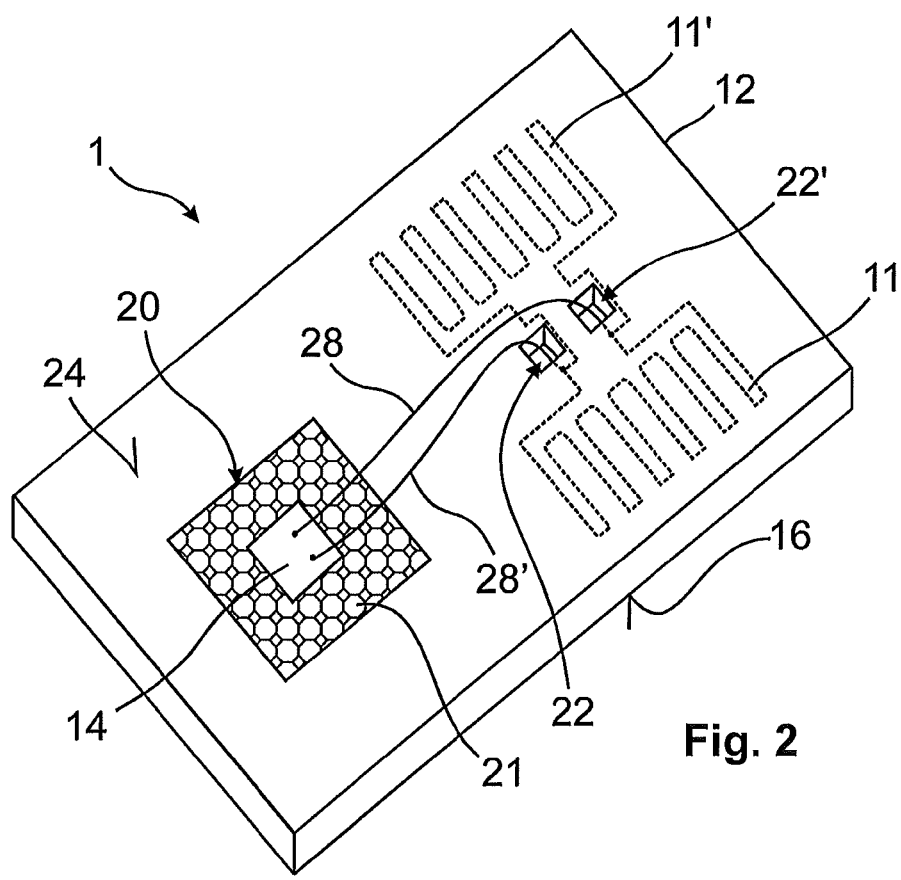
FIG. 2 is a schematic view of a second side of a carrier element of an inductive sensor device according to the invention.

In FIG. 2, a second side 24 of a carrier element 12 of an inductive sensor device 1 is shown schematically. The carrier element 12 has a first side 16, wherein two planar coils 11, 11' are arranged on the first side 16. The conductive tracks 11, 11' have a meander-shaped form. The carrier element 12 has two second openings 22, 22'. A first end of the planar coil 11 is arranged in the area of the second opening 22. A second opening 22' is likewise arranged at a second end of the planar coil 11. The first and the second ends of the planar coil 11 can be contacted electrically by means of an electrically conductive element 28, 28' via the two second openings 22, 22', respectively. Here, a wire 28, 28' is used that electrically connects an electronics unit 14 to the first and the second ends via the two second openings 22, 22'. The electronics unit 14 is here inserted in a first opening 20 with an accurate fit in height. The first opening 20 is closed by means of a sealant 21 up to the area of the electronics unit 14. In this way, the electronics unit 14 is fixed in the first opening 20. In addition, the electronics unit 14 can be insulated electrically from the carrier element 12 by the sealant 21. The electronics unit 14 has connection elements, wherein the connection elements are connected by means of a wire 28, 28' through the second openings 22 and 22' to the meander-shaped planar coil 11. A second planar coil 11' is here arranged electrically parallel to the planar coil 11.

Figure 3:
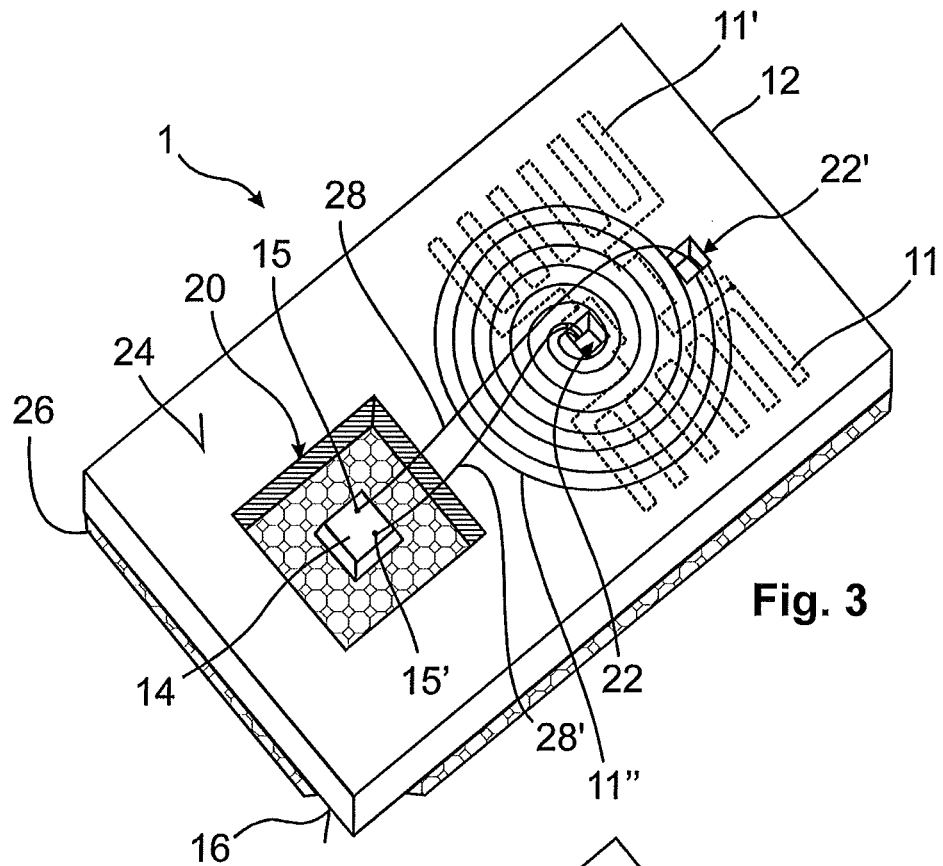
FIG. 3 is a schematic view of a second side of a carrier element with an electronics unit in a first opening.

In FIG. 3, a second side 24 of a carrier element 12 is shown schematically. The second side 24 has a helical planar coil 11". The carrier element 12 likewise has a first side 16, wherein the first side 16 here has a conductive film 26. The conductive film 26 can here be a copper layer or a gold layer. The conductive film is formed over the entire area of the first side 16. The conductive film 26 can be connected to the carrier element 12 by means of a bonding process. An electronics unit 14 is arranged in the area of the first opening 20, wherein the electronics unit 14 is arranged on a bottom side of the conductive film 26 in the area of the first opening 20. The electronics unit 14 can here be arranged on the bottom side of the conductive film 26 by means of a bonding process. A loose placement of the electronics unit 14 is also possible. A sealing process can be used here for fixing the electronics unit 14, wherein the sealant can fix the electronics unit 14 in the area of the first opening 20. The first side 16 has two meander-shaped planar coils 11, 11'. The two meander-shaped planar coils 11, 11' have a first and a second end, wherein the first end can be reached via a first second opening 22 and the second end can be reached via a second opening 22' from the second side 24 of the carrier element 12. The electronics unit 14 has a first connection element 15, wherein the first connection element 15 is connected via a wire 28 to the first end of the planar coil 11 in an electrically conductive way. The second connection element 15' is here arranged in an electrically conductive way via a wire 28' with the second end of the planar coil 11. Accordingly, a contacting of the second side 24 of the carrier element 12 through the two second openings 22 and 22' is possible with the first side 16 of the carrier element 12. The helical planar coil 11' is arranged on the second side 24 of the carrier element 12. Here, a first end of the helical planar coil 11" is connected to the first end of the planar coil 11 by means of an electrically conductive element. This likewise applies for the second end of the helical planar coil 11', wherein the second end of the helical planar coil 11' is connected electrically to the second end of the planar coil 11 by means of an electrically conductive element. A metal pin can be used here as the connection. A solder point is also conceivable, wherein the first side 16 can be electrically connected to the second side 24 of the carrier element 12.

Figure 4:
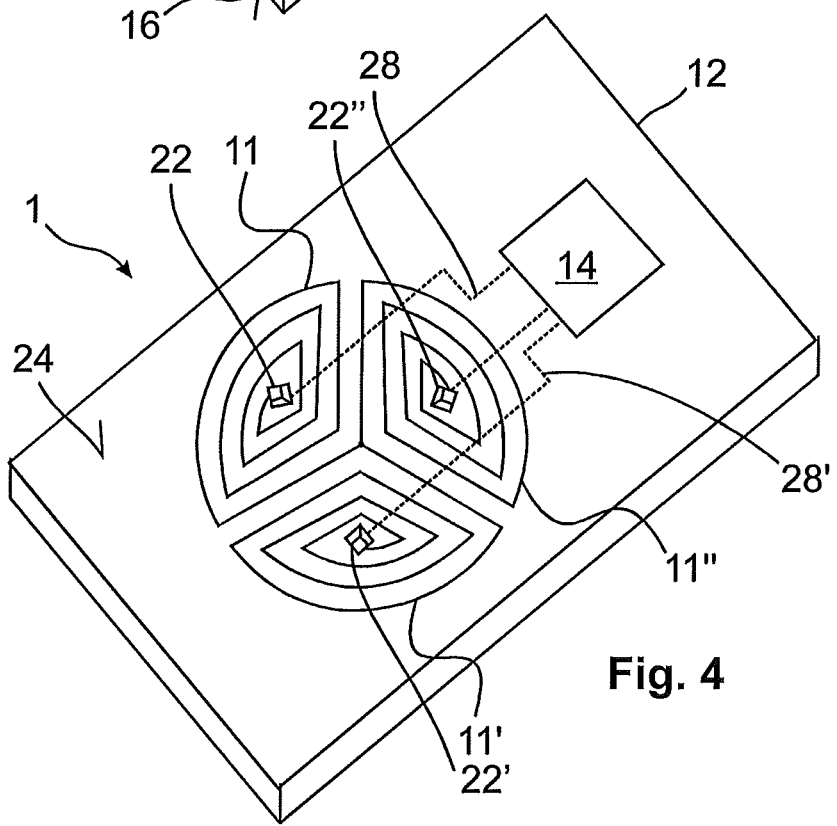
FIG. 4 is a schematic view of a second side of a carrier element with a three-phase coil.

In FIG. 4, an inductive sensor device 1 is shown schematically, wherein a three-phase planar coil 11, 11', 11" is arranged on a second side of a carrier element 12. The three-phase planar coil 11, 11', 11" consists of three helical elements, wherein each helical element is arranged offset at an angle of 120° from the next helical element. The three helical planar coils 11, 11', 11" can be formed as conductive tracks, wherein the conductive tracks can be produced by means of an etching method. For this purpose, a copper-laminated printed circuit board can be used. Other conductive materials apart from copper are also conceivable, e.g., gold. In addition, the carrier element 12 has, in total, three second openings 22, 22', 22", wherein a first end of the helical planar coil is arranged at each second opening. The helical planar coil 11, 11', 11" has a three-phase construction, its equivalent circuit equal to three coils arranged in parallel to each other. Here, the first end of the helical coil 11 is connected to an electronics unit 14 via a second opening 22 with a wire 28. The first end of a helical planar coil 11' is here connected to the electronics unit 14 via a second opening 22' in an electrically conductive way by means of a wire 28'. The third helical planar coil 11" is connected to the electronics unit 14 via a second opening 22' with a wire 28". Here, additional planar coils can be used that can also be arranged, in particular, on the first side 16 of the carrier element 12. Instead of the wires 28, 28', 28", conductive track elements can likewise be guided from the electronics unit 14 to the second opening 22, 22', 22".

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SYMBOLS

1 Sensor device
10 Coil
11 Planar coil
11' Planar coil
11" Planar coil
12 Carrier element
14 Electronics unit
15 Connection element
15' Connection element
16 First side
20 First opening
22 Second opening
22' Second opening
22" Second opening
24 Second side
26 Film
28 Wire
28' Wire
28" Wire

The invention claimed is:

1. An inductive sensor device for a motor vehicle, comprising:
   a carrier element having a first side in a first plane, the carrier element including a first depressed opening and at least one second depressed opening;
   a coil having a first end embedded in said at least one second depressed opening in said first side of said carrier element, said coil registering an induced voltage; and
   an electronics unit embedded in said first depressed opening of said first side of said carrier element;
   wherein said coil is electrically connected to said electronics unit, and wherein said coil is formed by at least one planar coil extending in the first plane.

2. The inductive sensor device according to claim 1, wherein said planar coil is operable to detect a rotational movement or translational movement.

3. The inductive sensor device according to claim 1, wherein the planar coil is formed as a conductive track.

4. The inductive sensor device according to claim 1, wherein the first opening is closed by a sealant.

5. The inductive sensor device according to claim 1, wherein an electrical conductive element, in particular, a wire, is guided through the second opening, wherein the electrical conductive element connects the first side of the carrier element to a second side of the carrier element in an electrically conductive manner.

6. The inductive sensor device according to claim 1, wherein the first side of the carrier element or a second side of the carrier element is coated with a protective layer that has, in particular, insulating properties.

7. The inductive sensor device according to claim 1, wherein the planar coil is formed as one of the group consisting of a meander-shaped, spiral, or helical conductive track.

* * * * *